US012627401B2

(12) United States Patent
Lee et al.

(10) Patent No.: US 12,627,401 B2
(45) Date of Patent: May 12, 2026

(54) APPARATUS AND METHOD FOR TRANSMITTING AND RECEIVING COVERT MESSAGE IN WIRELESS COMMUNICATION

(71) Applicant: ELECTRONICS AND TELECOMMUNICATIONS RESEARCH INSTITUTE, Daejeon (KR)

(72) Inventors: Sang-Woo Lee, Daejeon (KR); Yong-Sung Jeon, Daejeon (KR); Ha-Young Seong, Daejeon (KR); You-Sung Kang, Daejeon (KR); Ik-Kyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 378 days.

(21) Appl. No.: 18/350,157

(22) Filed: Jul. 11, 2023

(65) Prior Publication Data

US 2024/0171305 A1 May 23, 2024

(30) Foreign Application Priority Data

Nov. 23, 2022 (KR) ........................ 10-2022-0158051

(51) Int. Cl.
| | |
|---|---|
| *H04L 1/00* | (2006.01) |
| *H04L 1/1607* | (2023.01) |
| *H04L 69/22* | (2022.01) |

(52) U.S. Cl.
CPC .......... *H04L 1/0041* (2013.01); *H04L 1/0061* (2013.01); *H04L 1/1642* (2013.01)

(58) Field of Classification Search
CPC ... H04L 1/0041; H04L 1/0061; H04L 1/1642; H04L 1/004; H04L 69/22; H04L 2209/04
See application file for complete search history.

(56) References Cited

U.S. PATENT DOCUMENTS

| | | | |
|---|---|---|---|
| 8,005,080 | B2 | 8/2011 | Jun et al. |
| 10,856,128 | B2 | 12/2020 | Kang et al. |
| (Continued) | | | |

FOREIGN PATENT DOCUMENTS

| | | |
|---|---|---|
| JP | 4671776 B2 | 4/2011 |
| KR | 10-2227317 B1 | 3/2021 |
| KR | 10-2415672 B1 | 7/2022 |

OTHER PUBLICATIONS

Seong, Hayoung, et al., "Practical Covert Wireless Unidirectional Communication in IEEE 802.11 Environment", IEEE Internet of Things Journal, vol. 10, No. 2, Jan. 15, 2023, (18 Pages in English).

*Primary Examiner* — Hassan A Phillips
*Assistant Examiner* — Muhammad Ainul Huda
(74) *Attorney, Agent, or Firm* — NSIP Law

(57) ABSTRACT

Disclosed herein are an apparatus and method for transmitting a covert message in wireless communication. The apparatus for transmitting a covert message in wireless communication may be configured to, in a covert message in which a data frame is composed of a Start Frame Delimiter (SFD), a header, a payload, and a Cyclic Redundancy Check (CRC), transmit the SFD of the covert message corresponding to a first sequence number masked with a preset SFD mask length, transmit the header of the covert message corresponding to a second sequence number masked with a preset header mask length, transmit the payload of the covert message corresponding to a third sequence number masked with a preset payload mask length, and transmit the CRC of the covert message corresponding to a fourth sequence number masked with a preset CRC mask length.

15 Claims, 14 Drawing Sheets

(56)              References Cited

U.S. PATENT DOCUMENTS

| | | | |
|---|---|---|---|
| 2009/0220079 | A1 | 9/2009 | Harada et al. |
| 2010/0036462 | A1* | 2/2010 | Ramakrishnan ... A61N 1/37211 |
| | | | 607/60 |
| 2013/0107819 | A1 | 5/2013 | Noh et al. |
| 2021/0352053 | A1* | 11/2021 | Melodia ............. H04L 63/1475 |

* cited by examiner

S310

START

ESTABLISH COVERT MESSAGE
TRANSMISSION LAYER ——S410

SET LENGTH OF MASK OF SFD ——S420

MASK SEQUENCE NUMBER ——S430

S440

VALUE OF
MASKED SEQUENCE NUMBER =
VALUE OF MASKED
SFD?

NO

YES

S450

RETRANSMIT CORRESPONDING
SEQUENCE NUMBER

S460

INCREASE SEQUENCE NUMBER

TO S320

S810

START

ESTABLISH COVERT MESSAGE RECEPTION LAYER — S910

SET LENGTH OF MASK OF SFD — S920

RECEIVE DATA FRAME — S930

S940
IS SAME SEQUENCE NUMBER RECEIVED? — NO

YES

S950
MASK SEQUENCE NUMBER

S960
VALUE OF MASKED SEQUENCE NUMBER = VALUE OF MASKED SFD? — NO

YES

STORE SFD — S970

TO S820

APPARATUS AND METHOD FOR TRANSMITTING AND RECEIVING COVERT MESSAGE IN WIRELESS COMMUNICATION

CROSS REFERENCE TO RELATED APPLICATION

This application claims the benefit of Korean Patent Application No. 10-2022-0158051, filed Nov. 23, 2022, which is hereby incorporated by reference in its entirety into this application.

BACKGROUND OF THE INVENTION

1. Technical Field

The present disclosure relates generally to covert channel technology in wireless communication, and more particularly to an apparatus and method for transmitting and receiving a covert message in wireless communication.

2. Description of the Related Art

Wireless communication is divided into communication based on an overt channel and communication based on a covert channel. The overt channel refers to a channel through which communication is performed based on normal communication standards (specifications). In contrast, the covert channel refers to a hidden communication channel that is not disclosed to the general public without using a transmission method based on existing communication protocol standards. Covert message transmission technology using the covert channel is a communication technique used when it is not possible to transmit data by encapsulating the data in the payload of a typical communication protocol.

Covert channel technology is divided into a covert timing channel and a covert storage channel. The covert timing channel is a scheme for transmitting covert information using the timing information of normal traffic. That is, a transmitter may transmit covert information by adjusting the transmission time interval between normal packets when the normal packets are transmitted at regular intervals. The covert storage channel is a scheme for directly storing covert information in network traffic. That is, this is a scheme for inserting covert information into the protocol header or body area of a packet and transmitting the packet. The covert timing channel may be detected through a statistical analysis or the like on the time axis of a packet. However, since the covert storage channel is problematic in that data in the header and body areas may be extracted and can be detected through a statistical analysis.

Meanwhile, Korean Patent No. 10-2227317 entitled "Wi-Fi Physical (PHY) layer multi-band covert channel detector" discloses a Wi-Fi PHY layer multi-band covert channel detector, which simultaneously receives Wi-Fi signals through multiple communication channels, separates the Wi-Fi signals into logical multi-channel signals, and transfers the separated channel signals to a PHY layer multi-band covert channel detection unit.

SUMMARY OF THE INVENTION

Accordingly, the present disclosure has been made keeping in mind the above problems occurring in the prior art, and an object of the present disclosure is to covertly transmit data without exposing data to a malicious terminal when the malicious terminal is present on a network.

Another object of the present disclosure is to prevent data leakage from occurring through a malicious terminal when the malicious terminal on the network monitors the payload of a protocol.

In accordance with an aspect of the present disclosure to accomplish the above objects, there is provided an apparatus for transmitting a covert message in wireless communication, including one or more processors, and execution memory configured to store at least one program that is executed by the one or more processors, wherein the at least one program is configured to, in a covert message in which a data frame is composed of a Start Frame Delimiter (SFD), a header, a payload, and a Cyclic Redundancy Check (CRC), transmit the SFD of the covert message corresponding to a first sequence number masked with a preset SFD mask length, transmit the header of the covert message corresponding to a second sequence number masked with a preset header mask length, transmit the payload of the covert message corresponding to a third sequence number masked with a preset payload mask length, and transmit the CRC of the covert message corresponding to a fourth sequence number masked with a preset CRC mask length.

The at least one program may be configured to, when the masked first sequence number does not match the SFD, transmit the SFD depending on whether a new first sequence number obtained by increasing a value of the first sequence number corresponds to the SFD.

The at least one program may be configured to, when the masked second sequence number does not match the header, transmit the header depending on whether a new second sequence number obtained by increasing a value of the second sequence number corresponds to the header.

The at least one program may be configured to, when the masked third sequence number does not match the payload, transmit the payload depending on whether a new third sequence number obtained by increasing a value of the third sequence number corresponds to the payload.

The at least one program may be configured to transmit the payload corresponding to the third sequence number until a number of transmissions corresponding to a number of bytes set in a length field of the header are completed.

The at least one program may be configured to, when the masked fourth sequence number does not match the CRC, transmit the CRC depending on whether a new fourth sequence number obtained by increasing a value of the fourth sequence number corresponds to the CRC.

In accordance with another aspect of the present disclosure to accomplish the above objects, there is provided an apparatus for receiving a covert message in wireless communication, including one or more processors, and execution memory configured to store at least one program that is executed by the one or more processors, wherein the at least one program is configured to, in a covert message in which a data frame is composed of a Start Frame Delimiter (SFD), a header, a payload, and a Cyclic Redundancy Check (CRC), receive the data frame of the covert message, and store the data frame as the SFD when a sequence number of the data frame corresponds to a first sequence number of the SFD, receive the data frame of the covert message, and store the data frame as the header when the sequence number of the data frame corresponds to a second sequence number of the header, receive the data frame of the covert message, and store the data frame as the payload when the sequence number of the data frame corresponds to a third sequence number of the payload, receive the data frame of the covert message, and store the data frame as the CRC when the sequence number of the data frame corresponds to a fourth sequence number of the CRC, and compose the covert message from the stored SFD, header, payload, and CRC.

The at least one program may be configured to mask the sequence number of the data frame with a preset SFD mask length and store the data frame having the masked sequence number as the SFD.

The at least one program may be configured to mask the sequence number of the data frame with a preset header mask length and store the data frame having the masked sequence number as the header.

The at least one program may be configured to mask the sequence number of the data frame with a preset payload mask length and store the data frame having the masked sequence number as the payload.

The at least one program may be configured to store the payload until a number of receptions corresponding to a number of bytes in the payload set in a length field of the header are completed.

The at least one program may be configured to mask the sequence number of the data frame with a preset CRC mask length and store the data frame having the masked sequence number as the CRC.

In accordance with a further aspect of the present disclosure to accomplish the above objects, there is provided a method for transmitting a covert message in wireless communication, the method being performed by an apparatus for transmitting a covert message in wireless communication, the method including in a covert message in which a data frame is composed of a Start Frame Delimiter (SFD), a header, a payload, and a Cyclic Redundancy Check (CRC), transmitting the SFD of the covert message corresponding to a first sequence number masked with a preset SFD mask length, transmitting the header of the covert message corresponding to a second sequence number masked with a preset header mask length, transmitting the payload of the covert message corresponding to a third sequence number masked with a preset payload mask length, and transmitting the CRC of the covert message corresponding to a fourth sequence number masked with a preset CRC mask length.

Transmitting the SFD may include, when the masked first sequence number does not match the SFD, transmitting the SFD depending on whether a new first sequence number obtained by increasing a value of the first sequence number corresponds to the SFD.

Transmitting the header may include, when the masked second sequence number does not match the header, transmitting the header depending on whether a new second sequence number obtained by increasing a value of the second sequence number corresponds to the header.

Transmitting the payload may include, when the masked third sequence number does not match the payload, transmitting the payload depending on whether a new third sequence number obtained by increasing a value of the third sequence number corresponds to the payload.

Transmitting the payload may further include transmitting the payload corresponding to the third sequence number until a number of transmissions corresponding to a number of bytes set in a length field of the header are completed.

Transmitting the CRC may include, when the masked fourth sequence number does not match the CRC, transmitting the CRC depending on whether a new fourth sequence number obtained by increasing a value of the fourth sequence number corresponds to the CRC.

In accordance with yet another aspect of the present disclosure, there is provided a method for receiving a covert message in wireless communication, the method being performed by an apparatus for receiving a covert message in wireless communication, the method including, in a covert message in which a data frame is composed of a Start Frame Delimiter (SFD), a header, a payload, and a Cyclic Redundancy Check (CRC), receiving the data frame of the covert message, and storing the data frame as the SFD when a sequence number of the data frame corresponds to a first sequence number of the SFD; receiving the data frame of the covert message, and storing the data frame as the header when the sequence number of the data frame corresponds to a second sequence number of the header, receiving the data frame of the covert message, and storing the data frame as the payload when the sequence number of the data frame corresponds to a third sequence number of the payload, receiving the data frame of the covert message, and storing the data frame as the CRC when a sequence number of the data frame corresponds to a fourth sequence number of the CRC, and composing the covert message from the stored SFD, header, payload, and CRC.

Storing the data frame as the SFD may include masking a sequence number of the data frame with a preset SFD mask length, and storing the data frame having the masked sequence number as the SFD.

Storing the data frame as the header may include masking the sequence number of the data frame with a preset header mask length, and storing the data frame having the masked sequence number as the header.

Storing the frame as the payload may include masking the sequence number of the data frame with a preset payload mask length, and storing the data frame having masked sequence number as the payload.

Storing as the payload may include storing the payload until a number of receptions corresponding to a number of bytes of the payload set in a length field of the header are completed.

Storing the data frame as the CRC may include masking the sequence number of the data frame with a preset CRC mask length, and storing the data frame having the masked sequence number as the CRC.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
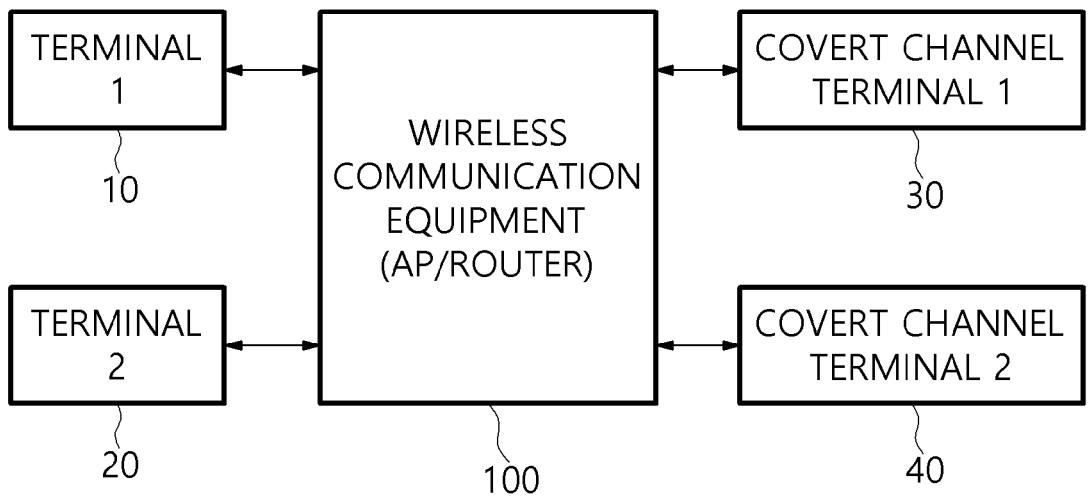
FIG. 1 is a diagram illustrating a covert channel environment in wireless communication according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the attached drawings.

FIG. 1 is a diagram illustrating a covert channel environment in wireless communication according to an embodiment of the present disclosure.

Referring to FIG. 1, terminal 1 (10) and terminal 2 (20) refer to terminals that use an overt channel.

Covert channel terminal 1 (30) and Covert channel terminal 2 (40) refer to terminals that use a covert channel.

The wireless communication equipment 100 may correspond to an apparatus for transmitting and receiving a covert message in wireless communication according to an embodiment of the present disclosure.

Here, the wireless communication equipment 100 refers to equipment for performing communication through an overt channel and a covert channel.

Here, an example of the wireless communication equipment 100 may include a router, an access point (AP) or the like.

Here, the wireless communication equipment 100 may provide a normal network service to the normal terminal 1 (10) and the terminal 2 (20) through the overt channel.

Here, the wireless communication equipment 100 may transfer covert information both to the covert channel terminal 1 (30) and the covert channel terminal 2 (40) through the covert channel.

Here, the wireless communication equipment 100 may transmit the covert information by encapsulating data in a payload having a communication protocol specification through the covert channel.

Figure 2:
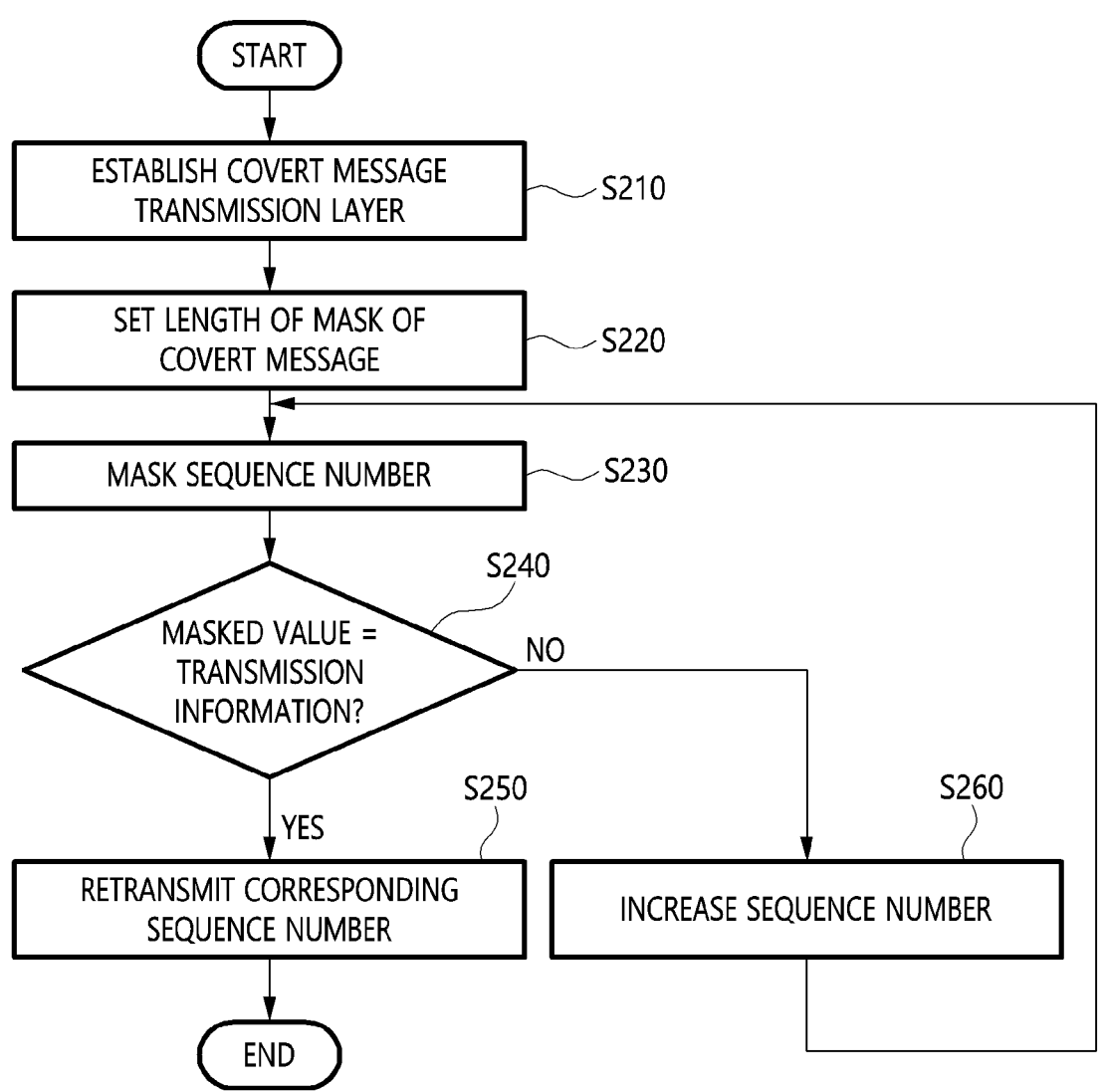
FIG. 2 is an operation flowchart illustrating a method for transmitting a covert message in wireless communication according to an embodiment of the present disclosure.

FIG. 2 is an operation flowchart illustrating a method for transmitting a covert message in wireless communication according to an embodiment of the present disclosure.

Referring to FIG. 2, the method for transmitting a covert message in wireless communication (also referred to as 'covert message transmission method in wireless communication) according to the embodiment of the present disclosure may first establish a covert message transmission layer at step S210.

That is, at step S210, a network layer desired to be utilized for transmitting a covert message may be established.

For example, at step S210, when it is desired to transmit a covert message in a Long-Term Evolution (LTE) communication specification, a Packet Data Convergence Protocol (PDCP) layer or a Radio Link Control (RLC) layer may be utilized.

Further, the covert message transmission method in wireless communication according to the embodiment of the present disclosure may set the length of the mask of the covert message at step S220.

Here, the mask may be a filter for extracting data desired to be selected from pieces of arbitrary data.

For example, at step S220, when, of 8-bit data 0x12, lower 4 bits of data are selected, the length of the mask may be set to 4 bits.

Further, the covert message transmission method in wireless communication according to the embodiment of the present disclosure may mask a sequence number at step S230.

In other words, at step S230, the sequence number of data transmitted at the established network layer may be masked with the set mask length.

Furthermore, the covert message transmission method in wireless communication according to the embodiment of the present disclosure may determine whether the masked value is identical to transmission information at step S240.

That is, when it is determined at step S240 that the masked (result) value is identical to data desired to be transmitted, data having the corresponding sequence number may be retransmitted at step S250, whereas when it is determined at step S240 that the masked value is not identical to the data desired to be transmitted, the sequence number may be increased by 1 at step S260, after which the sequence number may be re-masked, and data may be retransmitted.

Table 1 shows the composition of a covert message frame according to an embodiment of the present disclosure.

TABLE 1

| SFD | Header | | Payload | CRC |
| | Configuration | Length | | |
| --- | --- | --- | --- | --- |
| 0xAB | Mask length | Number of bytes of payload | Covert message | CRC from header to payload |

TABLE 1-continued

| | | Header | | |
|---|---|---|---|---|
| SFD | Configu-ration | Length | Payload | CRC |
| 1 byte | 1 byte | 1 byte (multiple of 4) | Multiple of 32 bits Max: 252 bytes (63 * 32 bits) | 1 byte |

A Start Frame Delimiter (SFD) field is a field indicating the start of a covert frame.

The size of the SFD is set to 1 byte.

A header field is composed of a configuration field and a length field. The configuration field denotes the length of the mask of the payload.

For example, when the mask length is 2 bits, the configuration field may be set to 0x2, when the mask length is 4 bits, the configuration field may be set to 0x4, and when the mask length is 8 bits, the configuration field may be set to 0x8.

The length field denotes the number of bytes of the payload of the covert message.

Because the basic unit of the payload of the covert message is a word (4 bytes), the length field may be set to a multiple of 4, and the size of the length field may be set to 1 byte.

The payload field denotes the covert message desired to be transmitted. The basic unit of the payload of the covert message payload is set to a word (4 bytes). Therefore, the maximum size of the covert message payload may be 252 bytes corresponding to the maximum multiple of 4 that can be expressed by 1 byte.

A Cyclic redundancy check (CRC) field denotes a field for checking a data transmission error.

The above-described Table 1 indicates an embodiment of a frame desired to be transmitted using the covert message transmission and reception method in wireless communication according to the present disclosure, and may be configured in other formats.

Figure 3:
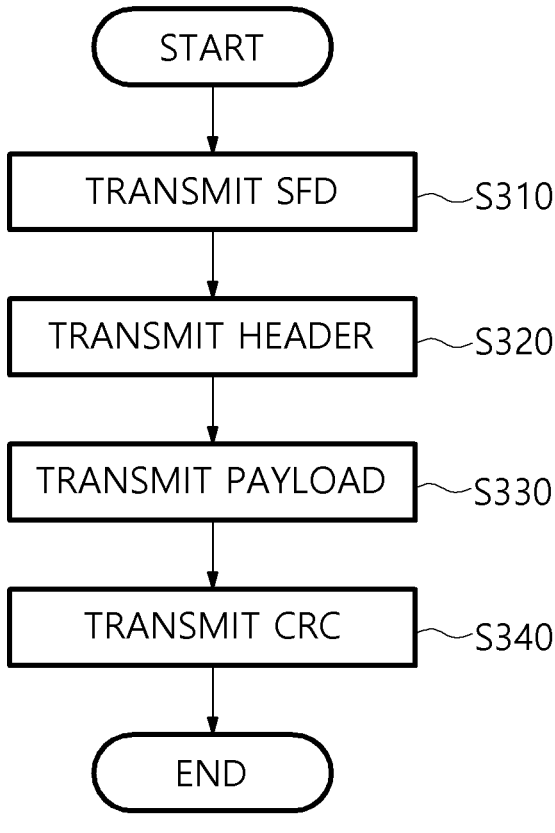
FIG. 3 is an operation flowchart illustrating a method for transmitting a covert message in wireless communication according to an embodiment of the present disclosure.
Figure 4:
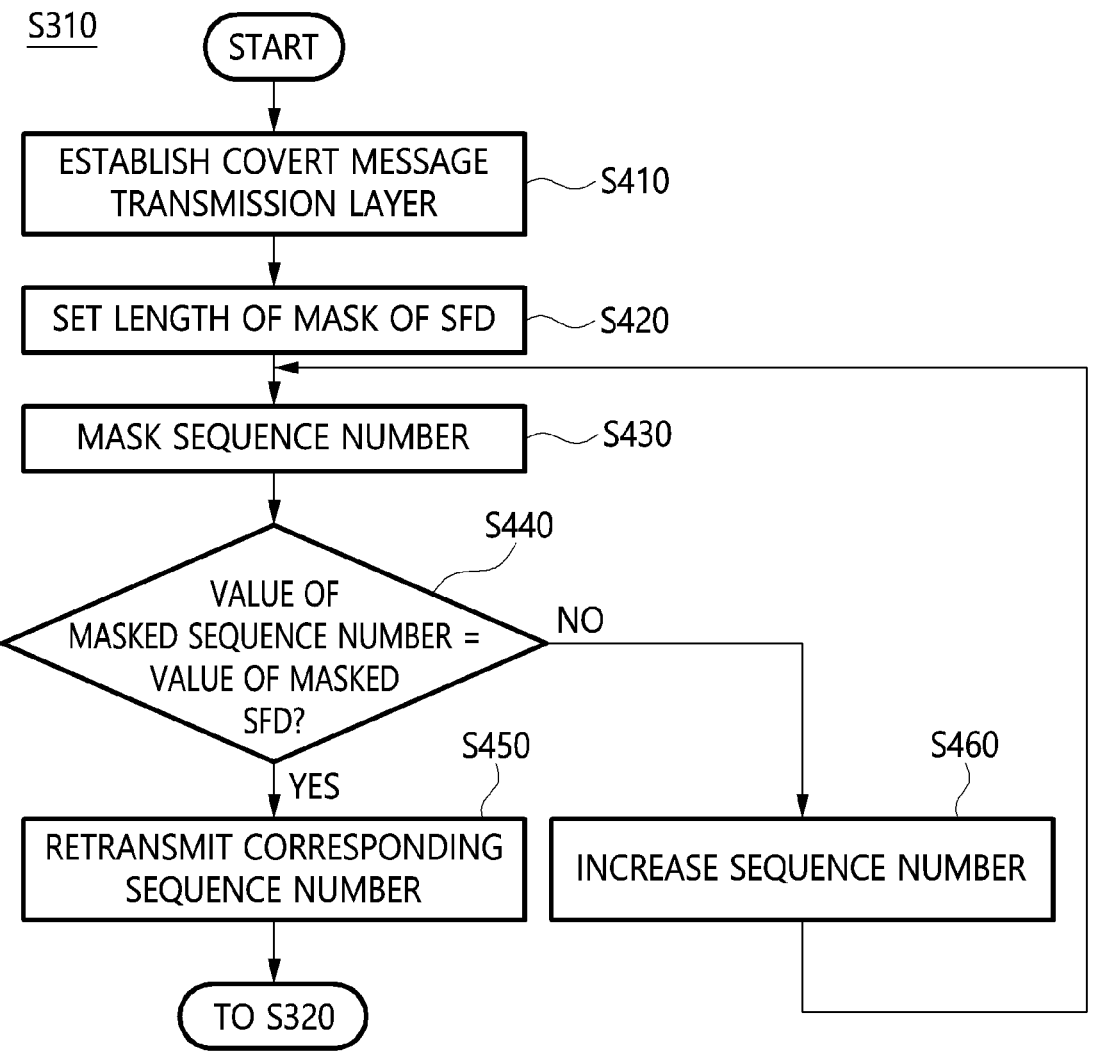
FIG. 4 is an operation flowchart illustrating in detail an example of the SFD transmission step illustrated in FIG. 3.
Figure 5:
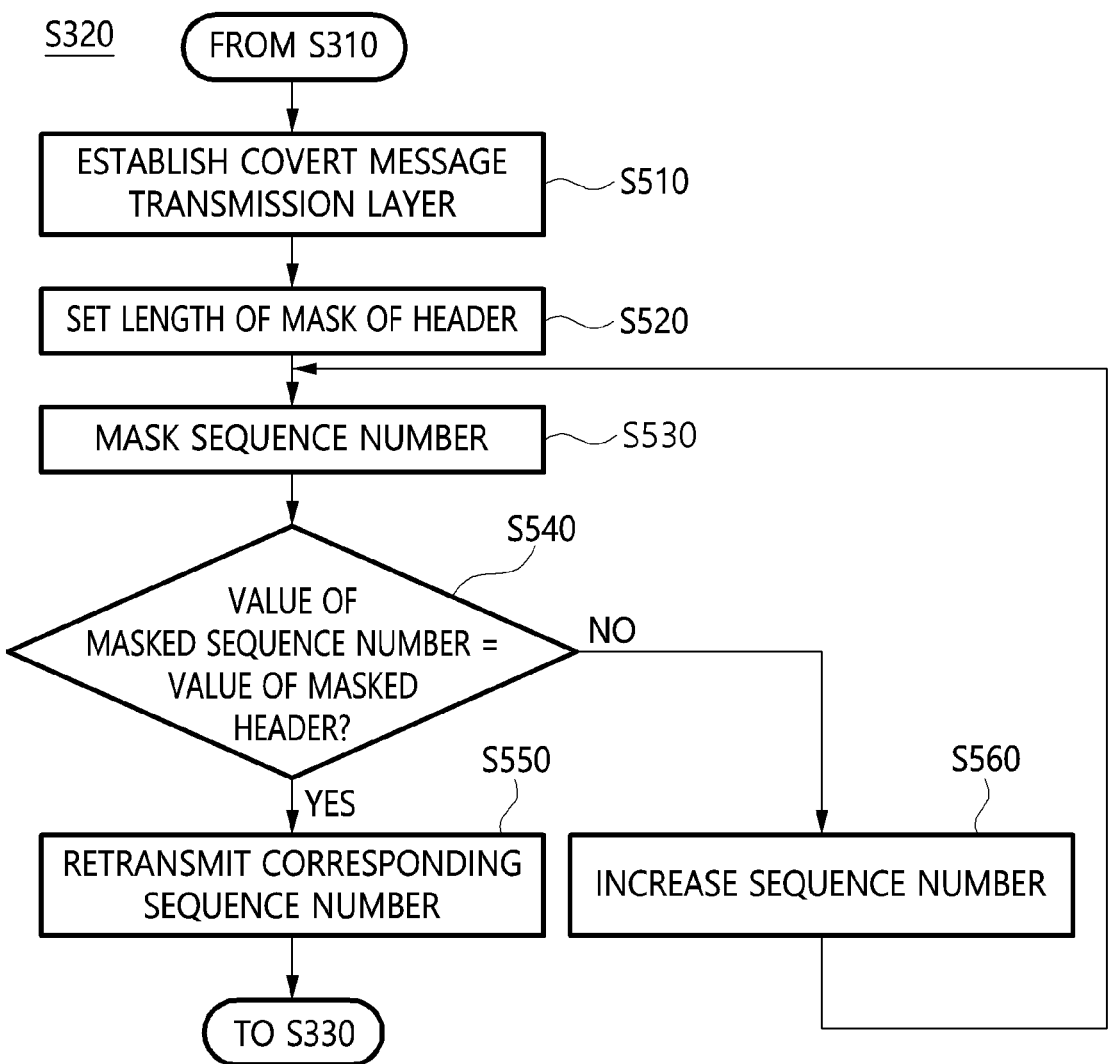
FIG. 5 is an operation flowchart illustrating in detail an example of the header transmission step illustrated in FIG. 3.
Figure 6:
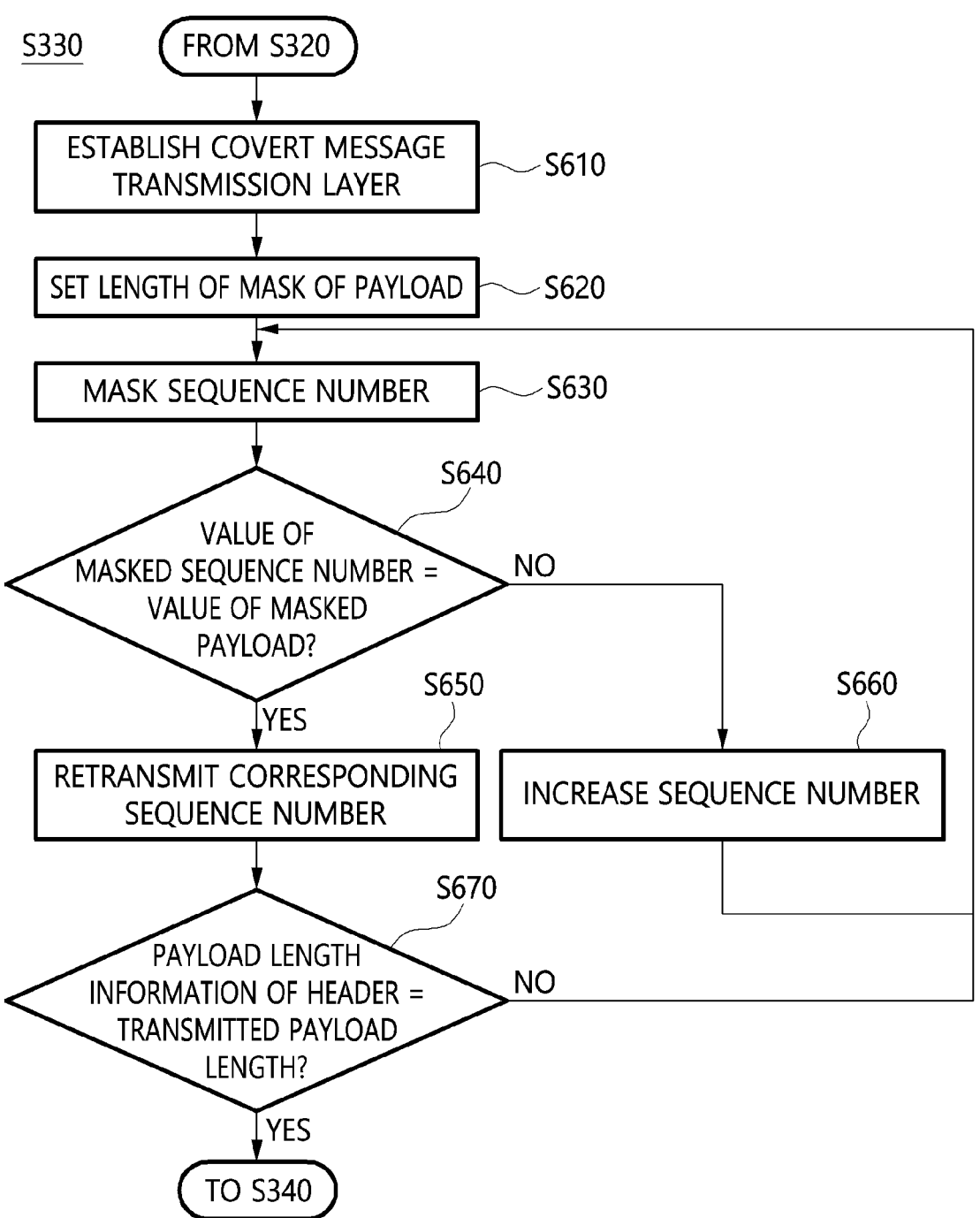
FIG. 6 is an operation flowchart illustrating in detail an example of the payload transmission step illustrated in FIG. 3.
Figure 7:
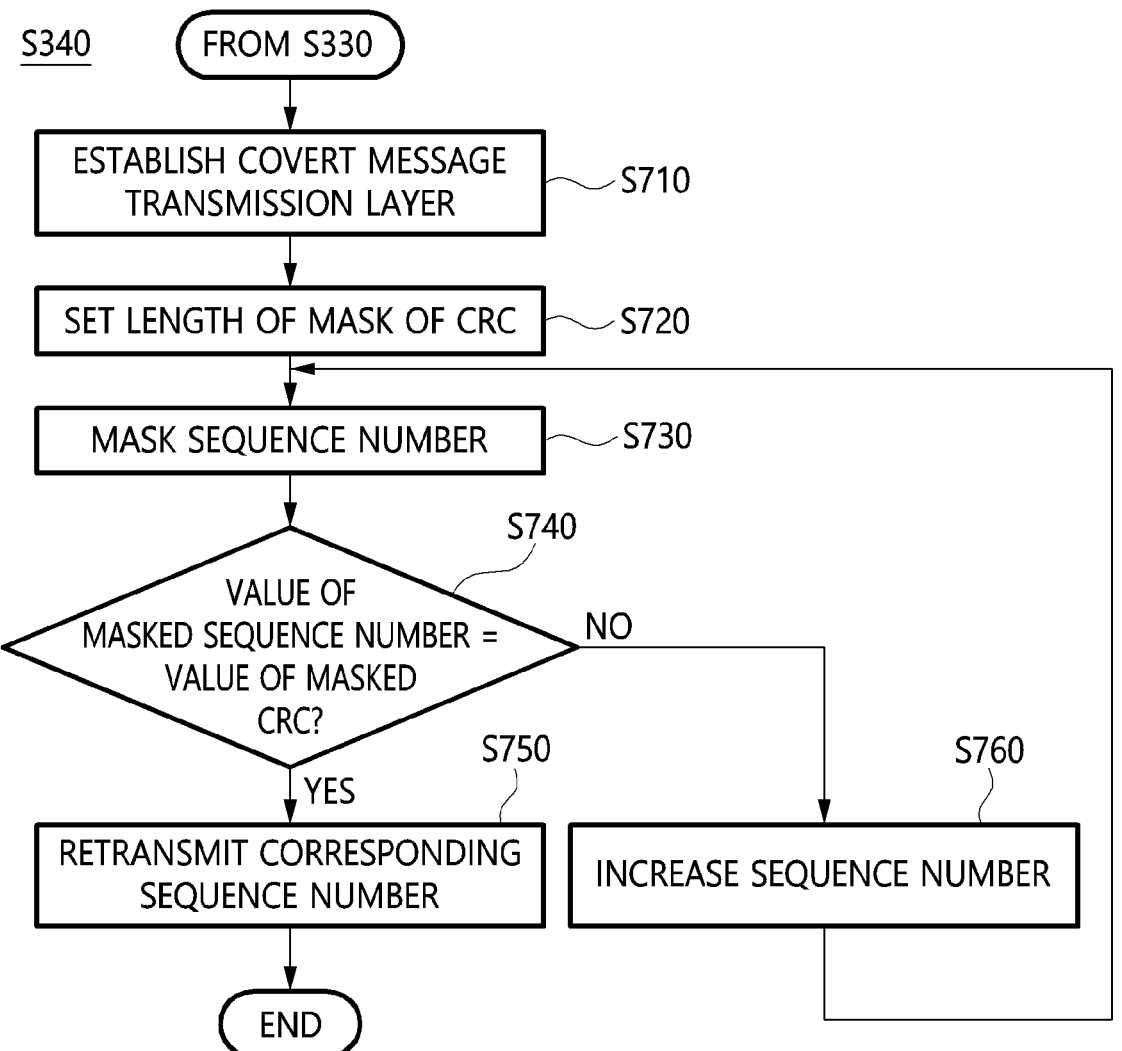
FIG. 7 is an operation flowchart illustrating in detail an example of the CRC transmission step illustrated in FIG. 3.

FIG. 3 is an operation flowchart illustrating a method for transmitting a covert message in wireless communication according to an embodiment of the present disclosure. FIG. 4 is an operation flowchart illustrating in detail an example of the SFD transmission step illustrated in FIG. 3. FIG. 5 is an operation flowchart illustrating in detail an example of the header transmission step illustrated in FIG. 3. FIG. 6 is an operation flowchart illustrating in detail an example of the payload transmission step illustrated in FIG. 3. FIG. 7 is an operation flowchart illustrating in detail an example of the CRC transmission step illustrated in FIG. 3.

Referring to FIG. 3, the method for transmitting a covert message according to the embodiment of the present disclosure may transmit an SFD at step S310.

That is, at step S310, the SFD of the covert message corresponding to a first sequence number, masked with a preset SFD mask length, may be transmitted.

Here, at step S310, when the masked first sequence number does not match the SFD, the SFD may be transmitted depending on whether a new first sequence number obtained by increasing the value of the first sequence number corresponds to the SFD.

Referring to FIG. 4, in a procedure at step S310, a covert message transmission layer may be established at step S410.

That is, at step S410, a network layer desired to be utilized for transmitting a covert message may be established.

Further, in the procedure at step S310, the length of the mask of the SFD may be set at step S420.

For example, at step S420, when, of 8-bit data 0x12, lower 4 bits of data are selected, the length of the mask may be set to 4 bits.

Further, in the procedure at step S310, the sequence number may be masked at step S430.

In other words, at step S430, the sequence number of data transmitted at the established network layer may be masked with the set mask length.

Also, in the procedure at step S310, whether the value of the masked sequence number is identical to the value of a masked SFD may be determined at step S440.

For example, at step S440, when the SFD is 0xAB and the mask length is 4 bits, whether the lower 4 bits of the corresponding sequence number are 0xB may be determined.

That is, when it is determined at step S440 that the value of the masked sequence number is identical to the value of the masked SFD, data having the corresponding sequence number may be retransmitted at step S450, whereas when it is determined at step S440 that the value of the masked sequence number is not identical to the value of the masked SFD, the sequence number may be increased by 1 at step S460, after which the sequence number may be re-masked, and then data may be retransmitted.

For example, at step S440, when the SFD is 0xAB and the mask length is 4 bits, data for which the lower 4 bits of the sequence number are 0xB is retransmitted at step S450, and the sequence number is increased at step S460, after which the above-described process may be repeated until data for which the lower 4 bits of the sequence number are 0xA is retransmitted.

Next, the covert message transmission method according to the embodiment of the present disclosure may transmit a header at step S320.

That is, at step S320, the header of the covert message corresponding to a second sequence number, masked with a preset header mask length, may be transmitted.

Here, at step S320, when the masked second sequence number does not match the header, the header may be transmitted depending on whether a new second sequence number obtained by increasing the value of the second sequence number corresponds to the header.

Referring to FIG. 5, in a procedure at step S320, a covert message transmission layer may be established at step S510.

That is, at step S510, a network layer desired to be utilized for transmitting a covert message may be established.

Further, in the procedure at step S320, the length of the mask of the header may be set at step S520.

For example, at step S520, when, of 8-bit data 0x12, lower 4 bits of data are selected, the length of the mask may be set to 4 bits.

Further, in the procedure at step S320, the sequence number may be masked at step S530.

In other words, at step S530, the sequence number of data transmitted at the established network layer may be masked with the set mask length.

Also, in the procedure at step S320, whether the value of the masked sequence number is identical to the value of a masked header may be determined at step S540.

For example, at step S540, when the configuration field of the header is 0x4, the length field thereof is 0x12, and the mask length of the header is 4 bits, whether the lower 4 bits of the corresponding sequence number is 0x4 may be determined.

That is, when it is determined at step S540 that the value of the masked sequence number is identical to the value of the masked header, data having the corresponding sequence number may be retransmitted at step S550, whereas when it is determined at step S540 that the value of the masked sequence number is not identical to the value of the masked header, the sequence number may be increased by 1 at step S560, after which the sequence number may be re-masked, and then data may be retransmitted.

For example, at step S540, when the configuration field of the header is 0x4, the length field thereof is 0x12, and the mask length of the header is 4 bits, data for which the lower 4 bits of the corresponding sequence number are 0x4 is retransmitted at step S550, and the sequence number is increased at step S560, after which the above-described process may be repeated until data for which the lower 4 bits of the sequence number are 0x1 is retransmitted.

Next, the covert message transmission method according to the embodiment of the present disclosure may transmit a payload at step S330.

That is, at step S330, the payload of the covert message corresponding to a third sequence number, masked with a preset payload mask length, may be transmitted.

Here, at step S330, when the masked third sequence number does not match the payload, the payload may be transmitted depending on whether a new third sequence number obtained by increasing the value of the third sequence number corresponds to the payload.

In this case, at step S330, the payload corresponding to the third sequence number may be transmitted until a number of transmissions corresponding to the number of bytes in the payload set in the length field of the header are completed.

Referring to FIG. 6, in a procedure at step S330, a covert message transmission layer may be established at step S610.

That is, at step S610, a network layer desired to be utilized for transmitting a covert message may be established.

Further, in the procedure at step S330, the length of the mask of the payload may be set at step S620.

That is, at step S620, the length of the mask of the payload may be set based on the configuration field of the header.

Further, in the procedure at step S330, the sequence number may be masked at step S630.

In other words, at step S630, the sequence number of data transmitted at the established network layer may be masked with the set mask length.

Also, in the procedure at step S330, whether the value of the masked sequence number is identical to the value of a masked payload may be determined at step S640.

For example, at step S640, when the payload is 0x12345678 and the configuration field of the header is 0x4, whether the lower 4 bits of the corresponding sequence number are 0x8 may be determined.

That is, when it is determined at step S640 that the value of the masked sequence number is identical to the value of the masked payload, data having the corresponding sequence number may be retransmitted at step S650, whereas when it is determined at step S640 that the value of the masked sequence number is not identical to the value of the masked payload, the sequence number may be increased by 1 at step S660, after which the sequence number may be re-masked, and then data may be retransmitted.

Also, in the procedure at step S330, whether the length of the masked payload is identical to the length of the transmitted payload may be determined at step S670.

That is, at step S670, steps S630 to 660 may be repeated until a number of transmissions corresponding to the number of bytes in the payload set in the length field of the header are completed.

For example, at step S670, when the payload is 0x12345678 and the configuration field of the header is 0x4, data for which the lower 4 bits of the current sequence number are 0x8 may be retransmitted, data for which the lower 4 bits of the current sequence number are 0x7 may be retransmitted, data for which the lower 4 bits of the current sequence number are 0x6 may be retransmitted, data for which the lower 4 bits of the current sequence number are 0x5 may be retransmitted, data for which the lower 4 bits of the current sequence number are 0x4 may be retransmitted, data for which the lower 4 bits of the current sequence number are 0x3 may be retransmitted, data for which the lower 4 bits of the current sequence number are 0x2 may be retransmitted, and data for which the lower 4 bits of the current sequence number are 0x1 may be retransmitted until a number of transmissions corresponding to the number of bytes in the payload set in the length field of the header are completed.

Next, the covert message transmission method according to the embodiment of the present disclosure may transmit a Cyclic Redundancy Check (CRC) at step S340.

That is, at step S340, the CRC of the covert message corresponding to a fourth sequence number, masked with a preset CRC mask length, may be transmitted.

Here, at step S340, when the masked fourth sequence number does not match the CRC, the CRC may be transmitted depending on whether a new fourth sequence number obtained by increasing the value of the fourth sequence number corresponds to the CRC.

Referring to FIG. 7, in a procedure at step S340, a covert message transmission layer may be established at step S710.

That is, at step S710, a network layer desired to be utilized for transmitting a covert message may be established.

Further, in the procedure at step S340, the length of the mask of the CRC may be set at step S720.

Further, in the procedure at step S340, the sequence number may be masked at step S730.

In other words, at step S730, the sequence number of data transmitted at the established network layer may be masked with the set mask length.

Also, in the procedure at step S340, whether the value of the masked sequence number is identical to the value of a masked CRC may be determined at step S740.

For example, at step S740, when the CRC is 0xCD and the mask length is 4 bits, whether the lower 4 bits of the corresponding sequence number are 0xD may be determined.

That is, when it is determined at step S740 that the value of the masked sequence number is identical to the value of the masked CRC, data having the corresponding sequence number may be retransmitted at step S750, whereas when it is determined at step S740 that the value of the masked sequence number is not identical to the value of the masked CRC, the sequence number may be increased by 1 at step S760, after which the sequence number may be re-masked, and then data may be retransmitted.

For example, when it is determined at step S740 that the CRC is 0xCD and the mask length is 4 bits, data for which the lower 4 bits of the sequence number are 0xD may be retransmitted at step S750, whereas when it is determined at step S740 that the mask length of the CRC is not 4 bits, the sequence number may be increased at step S760, after which the above-described process may be repeated until data for which the lower 4 bits of the sequence number are 0xC is retransmitted.

Figure 8:
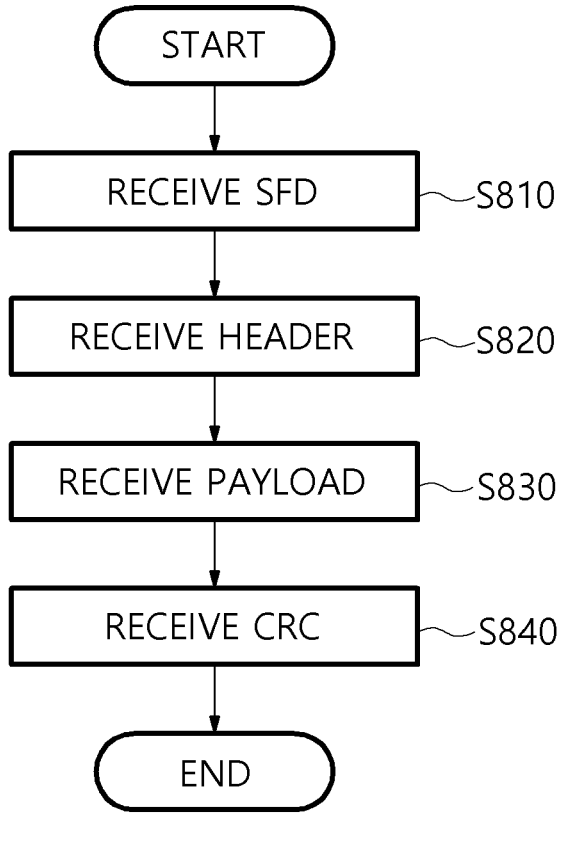
FIG. 8 is an operation flowchart illustrating a method for receiving a covert message in wireless communication according to an embodiment of the present disclosure.
Figure 9:
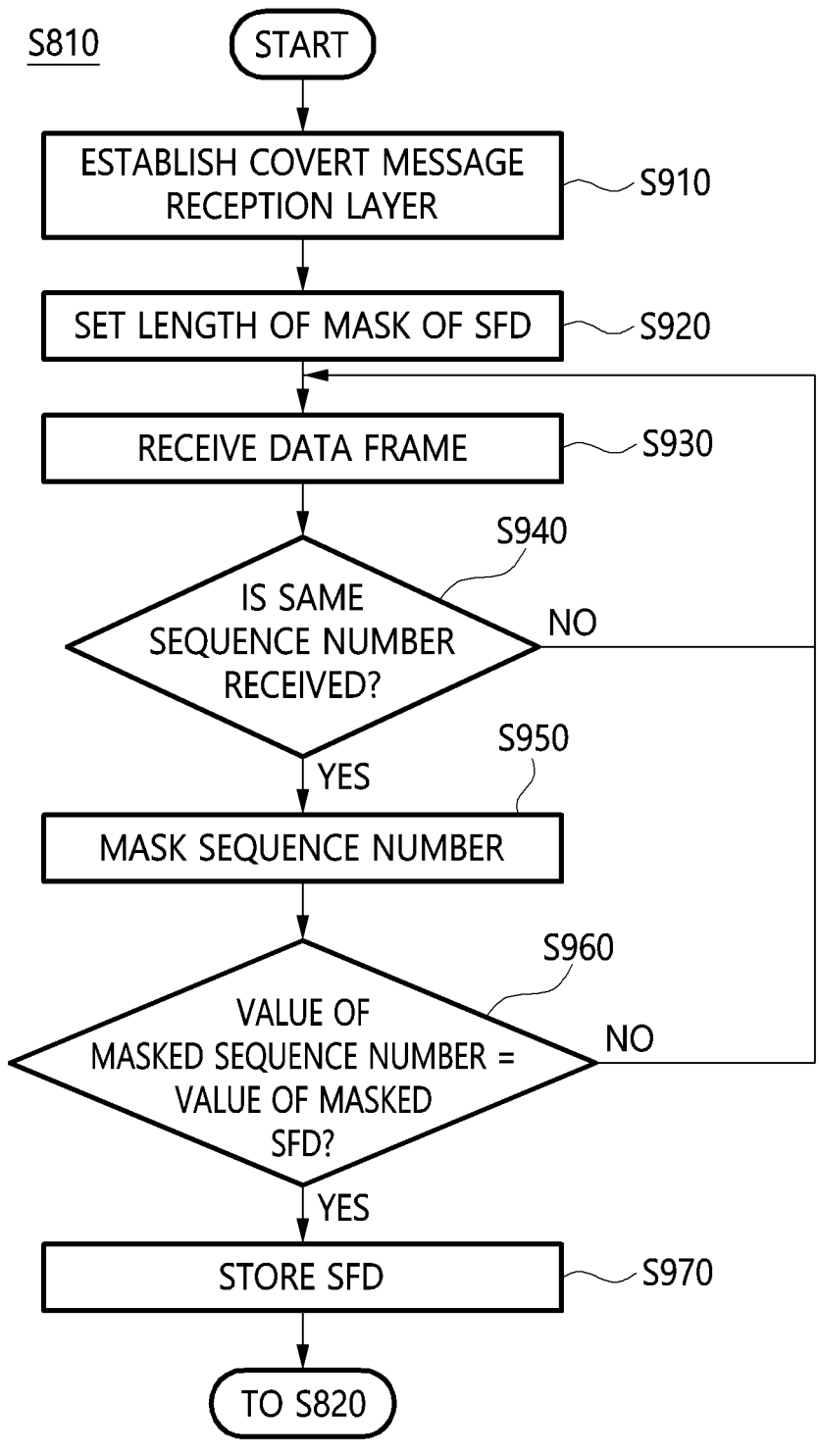
FIG. 9 is an operation flowchart illustrating in detail an example of the SFD reception step illustrated in FIG. 8.
Figure 10:
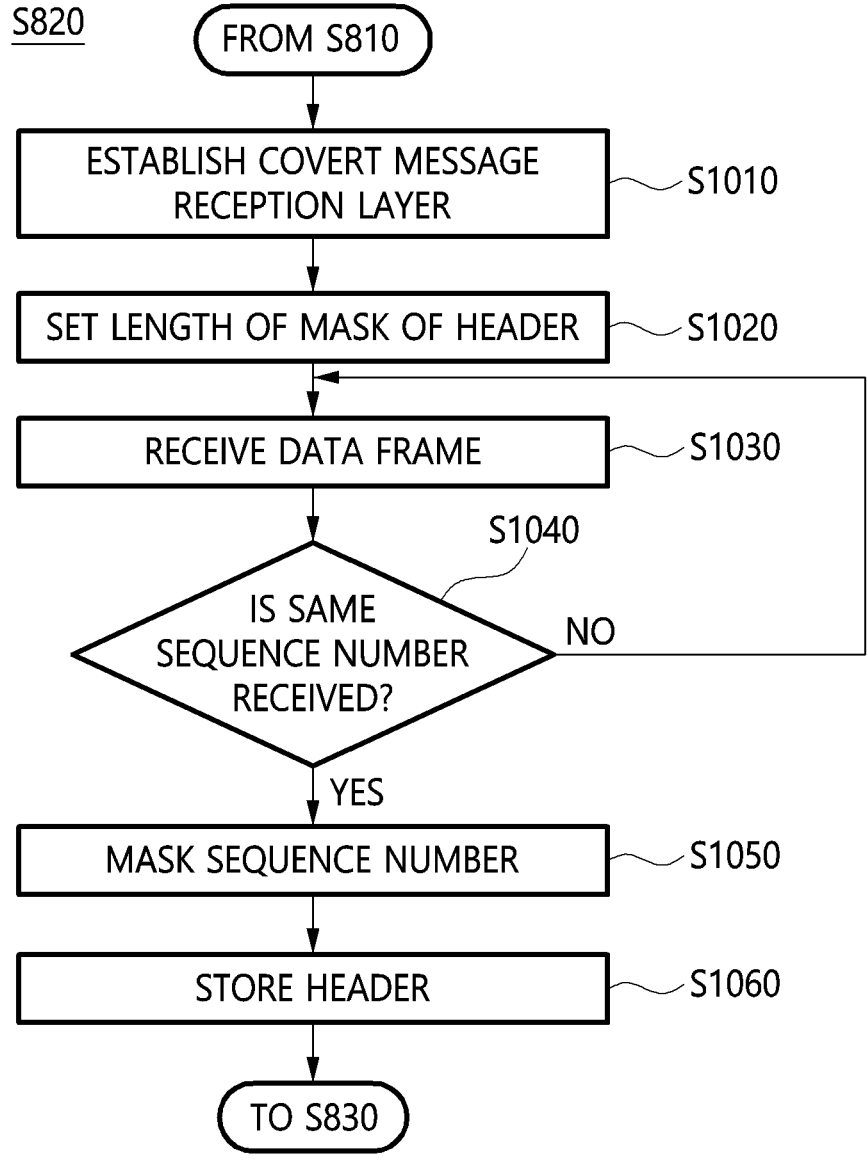
FIG. 10 is an operation flowchart illustrating in detail an example of the header reception step illustrated in FIG. 8.
Figure 11:
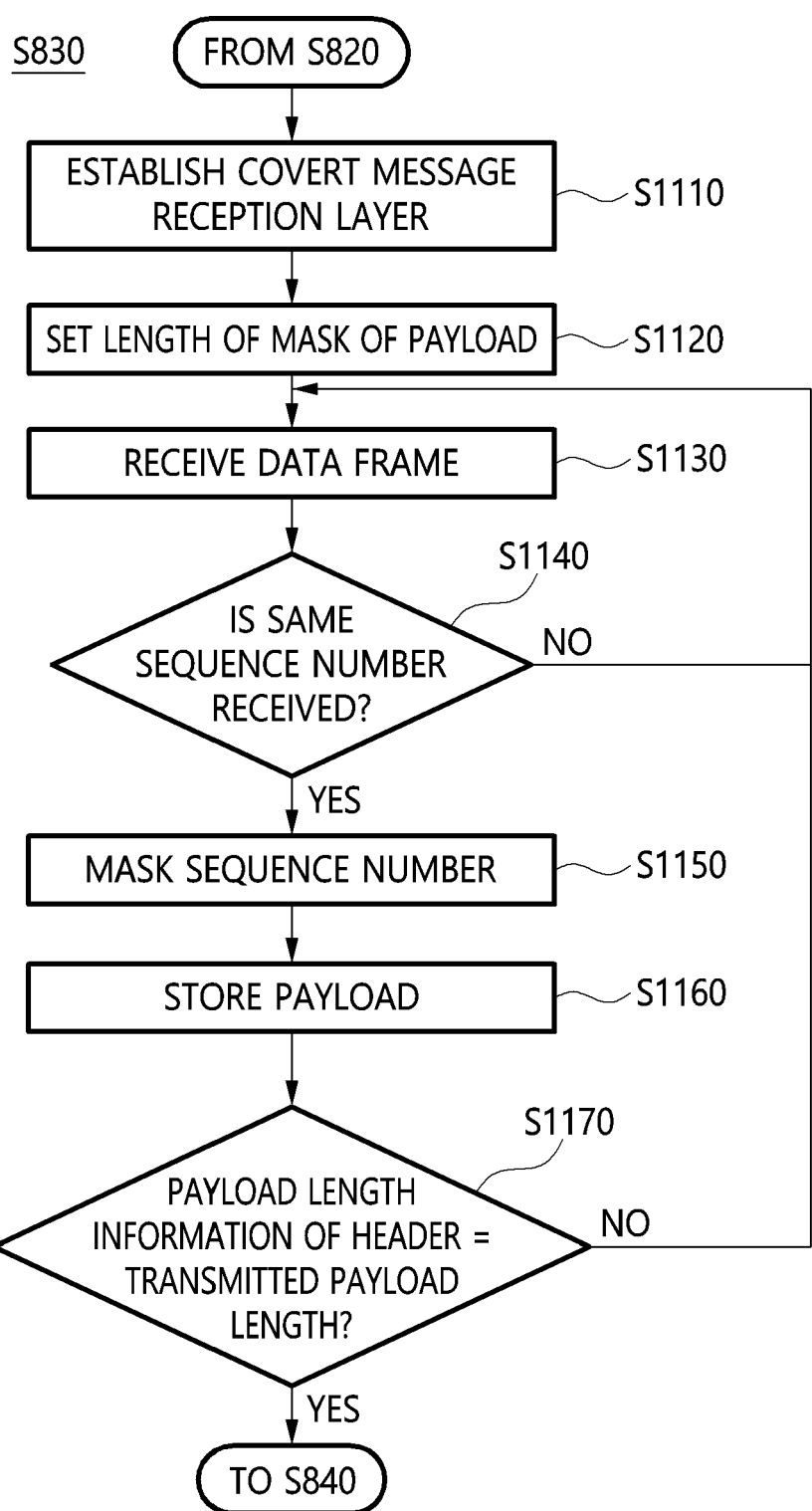
FIG. 11 is an operation flowchart illustrating in detail an example of the payload reception step illustrated in FIG. 8.
Figure 12:
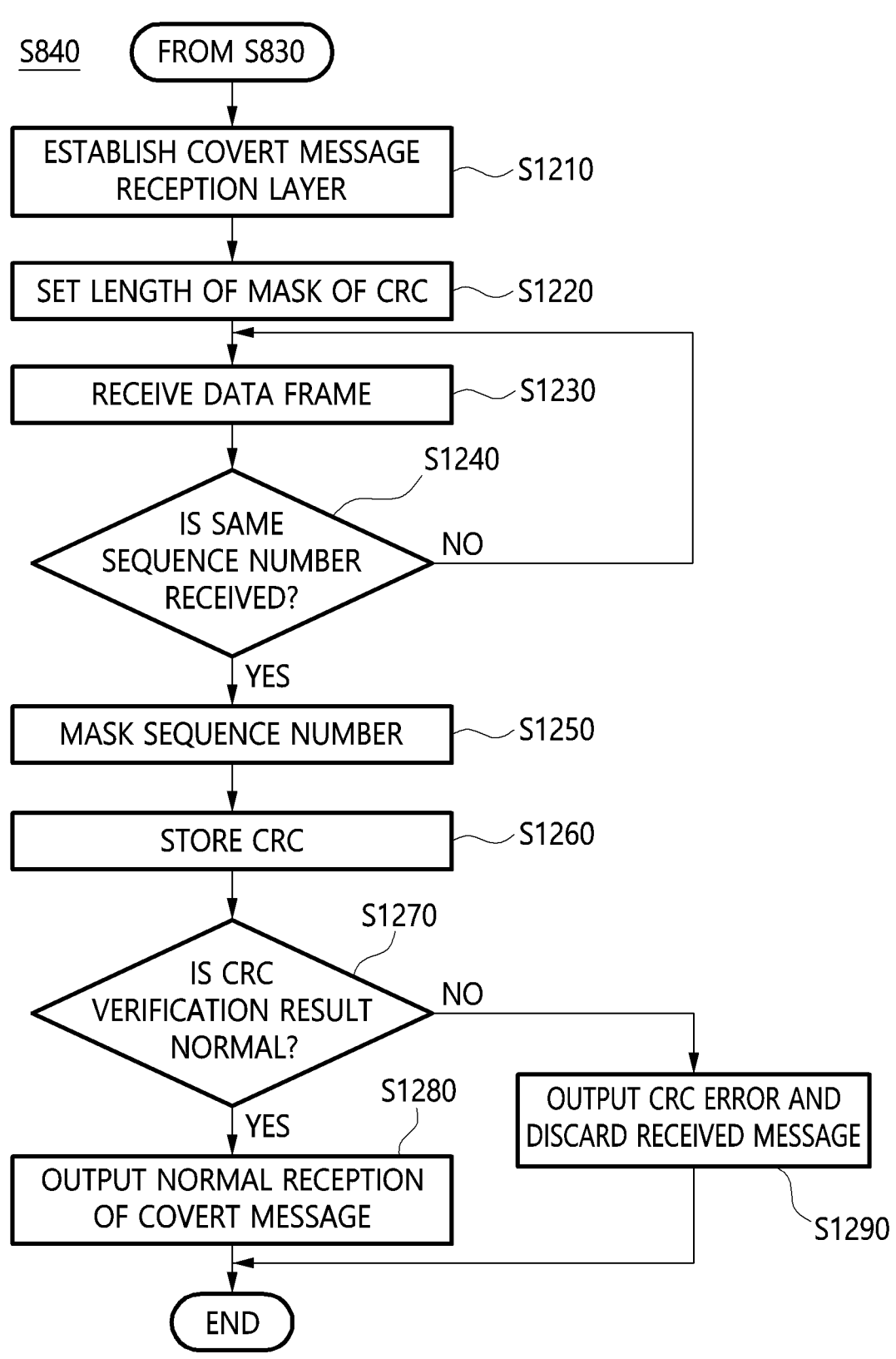
FIG. 12 is an operation flowchart illustrating in detail an example of the CRC reception step illustrated in FIG. 8.

FIG. 8 is an operation flowchart illustrating a method for receiving a covert message in wireless communication according to an embodiment of the present disclosure. FIG. 9 is an operation flowchart illustrating in detail an example of the SFD reception step illustrated in FIG. 8. FIG. 10 is an operation flowchart illustrating in detail an example of the header reception step illustrated in FIG. 8. FIG. 11 is an operation flowchart illustrating in detail an example of the payload reception step illustrated in FIG. 8. FIG. 12 is an operation flowchart illustrating in detail an example of the CRC reception step illustrated in FIG. 8.

Referring to FIG. 8, the method for receiving a covert message frame in wireless communication (hereinafter also referred to as the "covert message reception method in wireless communication") according to the embodiment of the present disclosure may receive an SFD at step S810.

That is, at step S810, when the data frame of the covert message is received and the sequence number of the data frame corresponds to the first sequence number of the SFD, the data frame may be stored as the SFD.

Here, at step S810, the sequence number of the data frame may be masked with a preset SFD mask length, and the data frame having the masked sequence number may be stored as the SFD.

Referring to FIG. 9, in a procedure at step S810, a covert message reception layer may be established at step S910.

That is, at step S910, a network layer desired to be utilized for receiving a covert message may be established.

Further, in the procedure at step S810, the length of the mask of the SFD may be set at step S920.

In the procedure at step S810, a data frame may be received at step S930.

That is, at step S930, the data frame may be received at the established network layer.

Furthermore, in the procedure at step S810, whether sequence number of the received data frame is identical to a preset sequence number of the SFD may be determined at step S940.

That is, when it is determined at step S940 that the sequence number of the received data frame is identical to the preset sequence number of the SFD, the sequence number may be masked with the mask length of the SFD at step S950, whereas when it is determined at step S940 that the sequence number of the received data frame is not identical to the preset sequence number of the SFD, the data frame may be re-received at step S930.

Also, in the procedure at step S810, whether the value of the masked sequence number is identical to that of a masked SFD may be determined at step S960.

That is, when it is determined at step S960 that the value of the masked sequence number is identical to the value of the masked SFD, the SFD may be stored at step S970, whereas when it is determined at step S960 that the value of the masked sequence number is not identical to the value of the masked SFD, the above-described process may be repeated until the reception of the SFD is completed.

For example, at step S960, when the SFD is 0xAB, the same sequence number is 0x1 B, and the mask length is 4 bits, lower 4 bits of the corresponding sequence number, that is, 0xB, may be extracted, and whether 0xB are identical to the lower 4 bits of the SFD, that is, 0xB, may be determined.

Further, in the procedure at step S810, the data frame having the masked sequence number may be stored as the SFD at step S970.

Furthermore, the covert message reception method in wireless communication according to the embodiment of the present disclosure may receive a header at step S820.

That is, at step S820, when the data frame of the covert message is received and the sequence number of the data frame corresponds to the second sequence number of the header, the data frame having the sequence number may be stored as the header.

Here, at step S820, the sequence number of the data frame may be masked with a preset header mask length, and the data frame having the masked sequence number may be stored as the header.

Referring to FIG. 10, in a procedure at step S820, a covert message reception layer may be established at step S1010.

That is, at step S1010, a network layer desired to be utilized for receiving a covert message may be established.

In the procedure at step S820, the length of the mask of the header may be set at step S1020.

Further, in the procedure at step S820, a data frame may be received at step S1030.

That is, at step S1030, the data frame may be received at the established network layer.

Furthermore, in the procedure at step S820, whether the sequence number of the received data frame is identical to a preset sequence number of the header may be determined at step S1040.

In other words, when it is determined at step S1040 that the sequence number of the received data frame is identical to the preset sequence number of the header, the sequence number may be masked with the mask length of the header at step S1050, whereas when it is determined at step S1040 that the sequence number of the received data frame is not identical to the preset sequence number of the header, the data frame may be re-received at step S1030.

For example, at step S1040, the total length of the header is 2 bytes, and thus the process may be repeated until 2 bytes are received.

Next, in the procedure at step S820, the data frame having the masked sequence number may be stored as the header at step S1060.

Meanwhile, the covert message transmission method in wireless communication according to the embodiment of the present disclosure may receive a payload at step S830.

That is, at step S830, when the data frame of the covert message is received and the sequence number of the data frame corresponds to the third sequence number of the payload, the data frame may be stored as the payload.

Here, at step S830, the sequence number of the data frame may be masked with a preset payload mask length, and the data frame having the masked sequence number may be stored as the payload.

Here, at step S830, the payload may be stored until a number of receptions corresponding to the number of bytes of the payload set in the length field of the header are completed.

Referring to FIG. 11, in a procedure at step S830, a covert message reception layer may be established at step S1110.

That is, at step S1110, a network layer desired to be utilized for receiving a covert message may be established.

Further, in the procedure at step S830, the length of the mask of the payload may be set at step S1120.

That is, at step S1120, the mask length extracted from the configuration field of the header may be set as the mask length of the payload.

Furthermore, in the procedure at step S830, a data frame may be received at step S1130.

That is, at step S1130, the data frame may be received at the established network layer.

Further, in the procedure at step S830, whether the sequence number of the received data frame is identical to a preset sequence number of the payload may be determined at step S1140.

That is, when it is determined at step S1140 that the sequence number of the received data frame is identical to the preset sequence number of the payload, the corresponding sequence number may be masked with the mask length of the payload at step S1150, whereas when it is determined at step S1140 that the sequence number of the received data frame is not identical to the preset sequence number of the payload, the data frame may be re-received to repeat the above-described process until a number of receptions of the payload corresponding to the number of bytes of the payload set in the length field of the header are completed.

Further, in the procedure at step S830, the data frame having the masked sequence number may be stored as the payload at step S1160.

Here, in the procedure at step S830, the above-described process may be repeated until a number of receptions corresponding to the number of bytes of the payload set in the length field of the header are completed at step S1170.

Next, the covert message reception method in wireless communication according to the embodiment of the present disclosure may receive a CRC at step S840.

That is, at step S840, when the data frame of the covert message is received and the sequence number of the data frame corresponds to the fourth sequence number of the CRC, the data frame may be stored as the CRC.

Here, at step S840, the sequence number of the data frame may be masked with a preset CRC mask length, and the data frame having the masked sequence number may be stored as the CRC.

In this case, at step S840, the covert message may be composed from the stored SFD, header, payload, and CRC.

Referring to FIG. 12, in a procedure at step S840, a covert message reception layer may be established at step S1210.

That is, at step S1210, a network layer desired to be utilized for receiving a covert message may be established.

Further, in the procedure at step S840, the length of the mask of the CRC may be set at step S1220.

Furthermore, in the procedure at step S840, a data frame may be received at step S1230.

That is, at step S1230, the data frame may be received at the established network layer.

Further, in the procedure at step S840, whether the sequence number of the received data frame is identical to a preset sequence number of the CRC may be determined at step S1240.

That is, when it is determined at step S1240 that the sequence number of the received data frame is identical to the preset sequence number of the CRC, the corresponding sequence number may be masked with the mask length of the CRC at step S1250, whereas when it is determined at step S1240 that the sequence number of the received data frame is not identical to the preset sequence number of the CRC, the data frame may be re-received to repeat the above-described process.

Also, in the procedure at step S840, the data frame having the masked sequence number may be stored as the CRC at step S1260.

Furthermore, in the procedure at step S840, whether the result of verification of the CRC is normal may be determined at step S1270.

That is, at step S1270, whether the stored CRC value is identical to a previously calculated CRC value may be verified.

Here, when it is verified at step S1270 the CRC value is identical to the previously calculated CRC value, it may be determined that the covert message is normally received, and "covert message normal reception" may be output at step S1280, whereas when it is verified at step S1270 that the CRC value is not identical to the previously calculated CRC value, a CRC error message may be output, and the received message may be discarded at step S1290.

Figure 13:
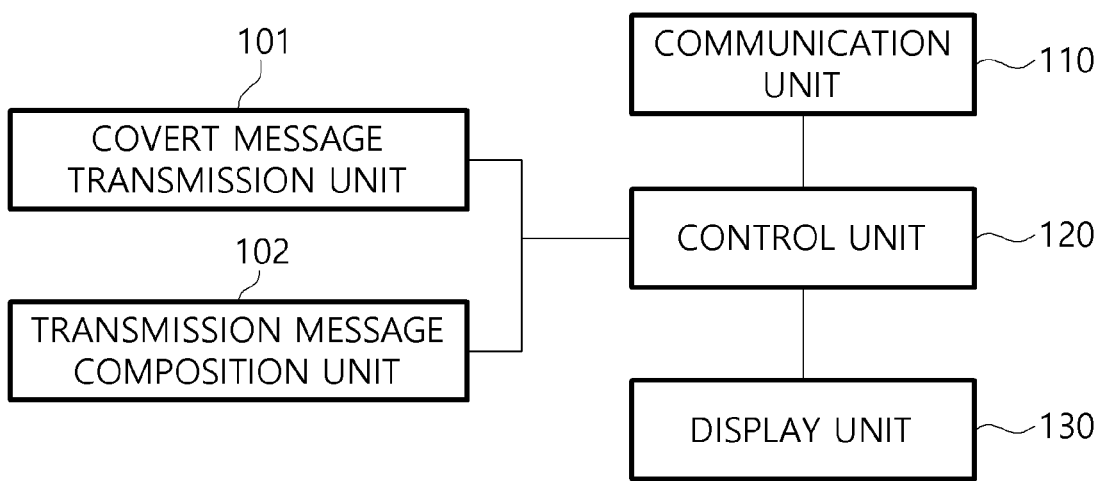
FIG. 13 is a block diagram illustrating an apparatus for transmitting a covert message in wireless communication according to an embodiment of the present disclosure.

FIG. 13 is a block diagram illustrating an apparatus for transmitting a covert message in wireless communication according to an embodiment of the present disclosure.

Referring to FIG. 13, the apparatus for transmitting a covert message in wireless communication according to the embodiment of the present disclosure may include a covert message transmission unit 101, a transmission message composition unit 102, a communication unit 110, a control unit 120, and a display unit 130.

The covert message transmission unit 101 may include an SFD transmission unit, a header transmission unit, a payload transmission unit, and a CRC transmission unit.

Here, the covert message transmission unit 101 may determine the sequence number of a data frame so as to transmit a covert message.

Here, the covert message transmission unit 101 may retransmit the same sequence number based on information determined depending on the length of a mask.

In this case, the covert message transmission unit 101 may perform the method for transmitting a covert message in wireless communication, described above with reference to FIGS. 3 to 7.

The transmission message composition unit 102 may compose the frame of the covert message.

In this case, the transmission message composition unit 102 may compose the frame of the covert message such as that shown in Table 1.

Here, the covert message transmission unit 101 may transmit the covert message using the covert message frame composed by the transmission message composition unit 102.

Figure 14:
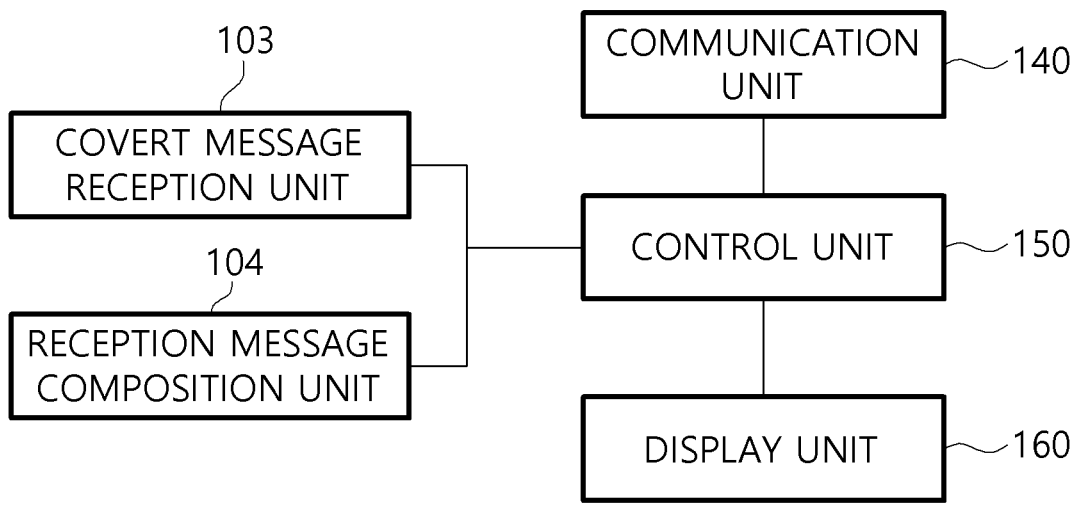
FIG. 14 is a block diagram illustrating an apparatus for receiving a covert message in wireless communication according to an embodiment of the present disclosure.

FIG. 14 is a block diagram illustrating an apparatus for receiving a covert message in wireless communication according to an embodiment of the present disclosure.

Referring to FIG. 14, the apparatus for receiving a covert message in wireless communication according to the embodiment of the present disclosure may include a covert message reception unit 103, a reception message composition unit 104, a communication unit 140, a control unit 150, and a display unit 160.

The covert message reception unit 103 may include an SFD reception unit, a header reception unit, a payload reception unit, and a CRC reception unit.

Here, the covert message reception unit 103 may check the sequence number of the received data frame, and may store an SFD, a header, a payload, and a CRC corresponding to the sequence number.

In this case, the covert message reception unit 103 may perform the covert message reception method, described above with reference to FIGS. 8 to 12.

The reception message composition unit 104 may compose the covert message from the data frame of the received covert message, as shown in Table 1.

In this case, the reception message composition unit 104 may recompose the covert message from the stored SFD, header, payload, and CRC.

Furthermore, the covert message transmission apparatus and the covert message reception apparatus in wireless communication according to embodiments of the present disclosure may be implemented in a single apparatus.

In this case, the covert message transmission apparatus and the covert message reception apparatus in wireless communication, which are implemented in a single apparatus, may include a covert message transmission unit 101, a transmission message composition unit 102, a covert message reception unit 103, a reception message composition unit 104, a communication unit 110, a control unit 120, and a display unit 130.

Here, the apparatus for transmitting and receiving a covert message in wireless communication may perform the covert message transmission method in wireless communication, described above with reference to FIGS. 3 to 7 and the covert message reception method in wireless communication, described above with reference to FIGS. 8 to 12.

Figure 15:
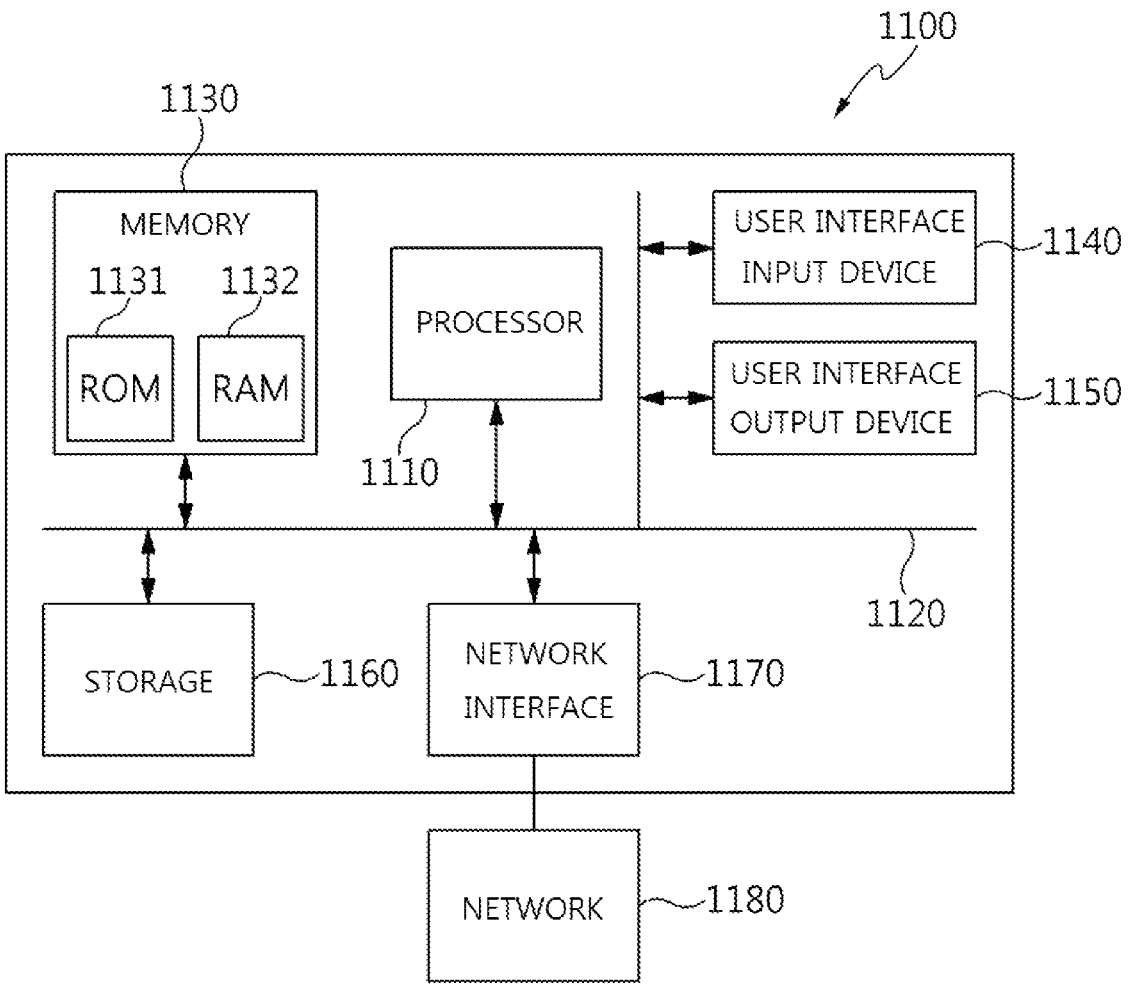
FIG. 15 is a diagram illustrating a computer system according to an embodiment of the present disclosure.

FIG. 15 is a diagram illustrating a computer system according to an embodiment of the present disclosure.

Referring to FIG. 15, each of an apparatus for transmitting a covert message and an apparatus for receiving a covert message in wireless communication according to embodiments of the present disclosure may be implemented in a computer system 1100 such as a computer-readable storage medium. As illustrated in FIG. 15, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

An apparatus for transmitting a covert message according to an embodiment of the present disclosure may include one or more processors 1110, and execution memory 1130 configured to store at least one program that is executed by the one or more processors, wherein the at least one program is configured to, in a covert message in which a data frame is composed of a Start Frame Delimiter (SFD), a header, a payload, and a Cyclic Redundancy Check (CRC), transmit the SFD of the covert message corresponding to a first sequence number masked with a preset SFD mask length, transmit the header of the covert message corresponding to a second sequence number masked with a preset header mask length, transmit the payload of the covert message corresponding to a third sequence number masked with a preset payload mask length, and transmit the CRC of the covert message corresponding to a fourth sequence number masked with a preset CRC mask length.

Here, the at least one program may be configured to, when the masked first sequence number does not match the SFD, transmit the SFD depending on whether a new first sequence number obtained by increasing a value of the first sequence number corresponds to the SFD.

Here, the at least one program may be configured to, when the masked second sequence number does not match the header, transmit the header depending on whether a new second sequence number obtained by increasing a value of the second sequence number corresponds to the header.

Here, the at least one program may be configured to, when the masked third sequence number does not match the payload, transmit the payload depending on whether a new third sequence number obtained by increasing a value of the third sequence number corresponds to the payload.

The at least one program may be configured to transmit the payload corresponding to the third sequence number until a number of transmissions corresponding to a number of bytes set in a length field of the header are completed.

Here, the at least one program may be configured to, when the masked fourth sequence number does not match the CRC, transmit the CRC depending on whether a new fourth sequence number obtained by increasing a value of the fourth sequence number corresponds to the CRC.

An apparatus for receiving a covert message in wireless communication according to an embodiment may include one or more processors 1110, and execution memory 1130 configured to store at least one program that is executed by the one or more processors, wherein the at least one program is configured to in a covert message in which a data frame is composed of a Start Frame Delimiter (SFD), a header, a payload, and a Cyclic Redundancy Check (CRC), receive the data frame of the covert message, and store the data frame as the SFD when a sequence number of the data frame corresponds to a first sequence number of the SFD, receive the data frame of the covert message, and store the data frame as the header when the sequence number of the data frame corresponds to a second sequence number of the header, receive the data frame of the covert message, and store the data frame as the payload when the sequence number of the data frame corresponds to a third sequence number of the payload, receive the data frame of the covert message, and store the data frame as the CRC when the sequence number of the data frame corresponds to a fourth sequence number of the CRC, and compose the covert message from the stored SFD, header, payload, and CRC.

Here, the at least one program may be configured to mask the sequence number of the data frame with a preset SFD mask length and store the data frame having the masked sequence number as the SFD.

Here, the at least one program may be configured to mask the sequence number of the data frame with a preset header mask length and store the data frame having the masked sequence number as the header.

Here, the at least one program may be configured to mask the sequence number of the data frame with a preset payload mask length and store the data frame having the masked sequence number as the payload.

Here, the at least one program may be configured to store the payload until a number of receptions corresponding to a number of bytes in the payload set in a length field of the header are completed.

Here, the at least one program may be configured to mask the sequence number of the data frame with a preset CRC mask length and store the data frame having the masked sequence number as the CRC.

The present disclosure may covertly transmit data without exposing data to a malicious terminal when the malicious terminal is present on a network.

Further, when a malicious terminal on a network monitors the payload of a protocol, the present disclosure may prevent data leakage from occurring through the malicious terminal.

As described above, in the apparatus and method for transmitting and receiving a covert message in wireless communication according to embodiments of the present disclosure, the configurations and schemes in the above-described embodiments are not limitedly applied, and some or all of the above embodiments can be selectively combined and configured so that various modifications are possible.

What is claimed is:

1. An apparatus for transmitting a covert message in wireless communication, comprising:

one or more processors; and an execution memory configured to store at least one program that is executed by the one or more processors, wherein the at least one program is configured to:

in a covert message in which a data frame is composed of a Start Frame Delimiter (SFD), a header, a payload, and a Cyclic Redundancy Check (CRC), transmit the SFD of the covert message corresponding to a first sequence number masked with a preset SFD mask length, transmit the header of the covert message corresponding to a second sequence number masked with a preset header mask length, transmit the payload of the covert message corresponding to a third sequence number masked with a preset payload mask length, and transmit the CRC of the covert message corresponding to a fourth sequence number masked with a preset CRC mask length, wherein the at least one program is configured to, when the masked first sequence number does not match the SFD, transmit the SFD depending on whether a new first sequence number obtained by increasing a value of the first sequence number corresponds to the SFD.

2. The apparatus of claim 1, wherein the at least one program is configured to, when the masked second sequence number does not match the header, transmit the header depending on whether a new second sequence number obtained by increasing a value of the second sequence number corresponds to the header.

3. The apparatus of claim 2, wherein the at least one program is configured to, when the masked third sequence number does not match the payload, transmit the payload depending on whether a new third sequence number obtained by increasing a value of the third sequence number corresponds to the payload.

4. The apparatus of claim 3, wherein the at least one program is configured to transmit the payload corresponding to the third sequence number until a number of transmissions corresponding to a number of bytes set in a length field of the header are completed.

5. The apparatus of claim 3, wherein the at least one program is configured to, when the masked fourth sequence number does not match the CRC, transmit the CRC depending on whether a new fourth sequence number obtained by increasing a value of the fourth sequence number corresponds to the CRC.

6. An apparatus for receiving a covert message in wireless communication, comprising:

one or more processors; and an execution memory configured to store at least one program that is executed by the one or more processors, wherein the at least one program is configured to:

in a covert message in which a data frame is composed of a Start Frame Delimiter (SFD), a header, a payload, and a Cyclic Redundancy Check (CRC), receive the data frame of the covert message, and store the data frame as the SFD when a sequence number of the data frame corresponds to a first sequence number of the SFD, receive the data frame of the covert message, and store the data frame as the header when the sequence number of the data frame corresponds to a second sequence number of the header, receive the data frame of the covert message, and store the data frame as the payload when the sequence number of the data frame corresponds to a third sequence number of the payload, receive the data frame of the covert message, and store the data frame as the CRC when the sequence number of the data frame corresponds to a fourth sequence number of the CRC, and compose the covert message from the stored SFD, header, payload, and CRC, wherein the at least one program is configured to mask the sequence number of the data frame with a preset SFD mask length and store the data frame having the masked sequence number as the SFD.

7. The apparatus of claim 6, wherein the at least one program is configured to mask the sequence number of the data frame with a preset header mask length and store the data frame having the masked sequence number as the header.

8. The apparatus of claim 7, wherein the at least one program is configured to mask the sequence number of the data frame with a preset payload mask length and store the data frame having the masked sequence number as the payload.

9. The apparatus of claim 8, wherein the at least one program is configured to store the payload until a number of receptions corresponding to a number of bytes in the payload set in a length field of the header are completed.

10. The apparatus of claim 8, wherein the at least one program is configured to mask the sequence number of the data frame with a preset CRC mask length and store the data frame having the masked sequence number as the CRC.

11. A method for transmitting a covert message in wireless communication, the method being performed by an apparatus for transmitting a covert message in wireless communication, the method comprising:

in a covert message in which a data frame is composed of a Start Frame Delimiter (SFD), a header, a payload, and a Cyclic Redundancy Check (CRC), transmitting the SFD of the covert message corresponding to a first sequence number masked with a preset SFD mask length;

transmitting the header of the covert message corresponding to a second sequence number masked with a preset header mask length;

transmitting the payload of the covert message corresponding to a third sequence number masked with a preset payload mask length; and transmitting the CRC of the covert message corresponding to a fourth sequence number masked with a preset CRC mask length, wherein transmitting the SFD comprises:

when the masked first sequence number does not match the SFD, transmitting the SFD depending on whether a new first sequence number obtained by increasing a value of the first sequence number corresponds to the SFD.

12. The method of claim 11, wherein transmitting the header comprises:

when the masked second sequence number does not match the header, transmitting the header depending on whether a new second sequence number obtained by increasing a value of the second sequence number corresponds to the header.

13. The method of claim 12, wherein transmitting the payload comprises:

when the masked third sequence number does not match the payload, transmitting the payload depending on whether a new third sequence number obtained by increasing a value of the third sequence number corresponds to the payload.

14. The method of claim 13, wherein transmitting the payload further comprises:

transmitting the payload corresponding to the third sequence number until a number of transmissions corresponding to a number of bytes set in a length field of the header are completed.

15. The method of claim 13, wherein transmitting the CRC comprises:

when the masked fourth sequence number does not match the CRC, transmitting the CRC depending on whether a new fourth sequence number obtained by increasing a value of the fourth sequence number corresponds to the CRC.

\* \* \* \* \*